(12) United States Patent
Casey (10) Patent No.: US 8,602,224 B2
(45) Date of Patent: Dec. 10, 2013

(54) TIMED LOCKING ANTI-SWEEP MECHANISM AND DISPLAY DEVICE

(76) Inventor: Michael Casey, Smyrna, GA (US)

( * ) Notice: Subject to any disclaimer, the term of this patent is extended or adjusted under 35 U.S.C. 154(b) by 473 days.

(21) Appl. No.: 12/879,100

(22) Filed: Sep. 10, 2010

(65) Prior Publication Data
US 2011/0062092 A1    Mar. 17, 2011

Related U.S. Application Data

(60) Provisional application No. 61/242,532, filed on Sep. 15, 2009.

(51) Int. Cl.
*E05B 73/00* (2006.01)

(52) U.S. Cl.
USPC ........... 211/7; 211/57.1; 211/59.1; 340/568.1

(58) Field of Classification Search
USPC ...................... 211/4, 7, 54.1, 59.1, 59.2, 57.1; 248/306, 308; 340/568.1, 568.8
See application file for complete search history.

(56) References Cited

U.S. PATENT DOCUMENTS

| | | | | | |
|---|---|---|---|---|---|
| 3,481,482 | A | * | 12/1969 | Wilkens | 248/220.41 |
| 3,827,569 | A | * | 8/1974 | Canning | 211/7 |
| 5,711,432 | A | * | 1/1998 | Stein et al. | 211/57.1 |
| 5,887,730 | A | * | 3/1999 | St. George | 211/4 |
| 6,491,169 | B1 | * | 12/2002 | Salonen | 211/4 |
| 7,484,628 | B2 | * | 2/2009 | Schneider | 211/57.1 |
| 7,768,399 | B2 | * | 8/2010 | Hachmann et al. | 340/568.1 |
| 8,242,910 | B2 | * | 8/2012 | Skjellerup et al. | 340/572.1 |
| 2007/0095766 | A1 | * | 5/2007 | Richtman et al. | 211/71.01 |
| 2008/0047909 | A1 | * | 2/2008 | Hamaji et al. | 211/1.57 |
| 2012/0253508 | A1 | * | 10/2012 | Holmes | 700/232 |

* cited by examiner

*Primary Examiner* — Korie H Chan
(74) *Attorney, Agent, or Firm* — Laurence P. Colton; Smith Risley Tempel Santos LLC

(57) ABSTRACT

An anti-sweep device having a mechanism that allows a customer to take a pre-determined number of items from a peg or display hook, after which the hook is locked for a pre-determined period of time before allowing another predetermined number of items to be taken.

15 Claims, 5 Drawing Sheets

TIMED LOCKING ANTI-SWEEP MECHANISM AND DISPLAY DEVICE

CROSS-REFERENCE TO RELATED APPLICATIONS

This application claims the benefit of U.S. Provisional Application No. 61/242,532, filed Sep. 15, 2009, which is incorporated herein by this reference in its entirety.

BACKGROUND OF THE INVENTION

1. Technical Field

The invention is generally related to the field of display devices for supporting and displaying items and is more specifically related to the field of locking anti-sweep display devices that prevent or discourage theft of the displayed items by incorporating a locking mechanism. The invention also relates to the field of timed locking display devices that allow the removal of one or a certain number of items from the device during a predetermined length or period of time.

2. Related Art

Peg or display hooks are commonly used in retail stores for displaying merchandise. Several of the same items can be hung on a single hook to display the items for sale. This display method has several advantages, including allowing continuous viewing of the item. When the front item is removed on a single hook display, the next item is visible, which allows several items to be stocked on the sales floor at one time. A single hook display method also accommodates various display configurations because the hooks can be moved about the supporting pegboard wall almost at will. Such hooks, however, also can allow thieves to take many items from the hooks easily and in a very short period of time. The taking of many or all of the in-stock units of a particular product by thieves (commonly referred to as "sweeping") is a major problem in the retail industry.

There have been many attempts to solve the sweeping problem while maintaining a display that is reasonably accessible and versatile. Some proposed solutions used in conjunction with a single hook display include a locking device on the hook that locks up only a selected portion of the merchandise, leaving the rest available for purchase and removal. While this method exposes only the units in front of the locking device to potential theft, the units behind the lock, disadvantageously, must be maintained, constantly monitored, and moved in front of the lock by personnel in order to be accessible by customers wishing to purchase the merchandise. If a supply of items is not monitored and continuously made available in front of the lock, the customer has to bear the inconvenience of finding an employee to unlock the device to allow the customer to take the item, and the employees must dedicate increased time performing these tasks.

Other solutions to the sweeping problem involve modifying a display rack such that it is more difficult to remove products from the display. Such modifications can include forcing one to manipulate parts or to navigate a crooked track in order to remove the merchandise from the display. These modifications, however, do not provide much deterrence to a skilled thief, but can greatly annoy and potentially deter customers.

Still other solutions employ devices to prevent multiple items from being taken at the same time. While such solutions are generally effective at preventing a thief from sweeping, such devices may not prevent the theft of many individual items and often merely slow the pace of a skilled "sweeper." As an illustration, if a thief would normally take about five seconds to sweep all of the merchandise at once from a straight, unlocked hook, and about ten seconds to take all of the products at once from a crooked or other type of hook, the deterrent factor is likely to be minimal.

Although there are many different types of peg or display hooks used in the retail industry to display merchandise, there are four basic common designs: a straight hook, a parallel bar hook, hooks incorporating a safety mechanism, and hooks incorporating a security lock. For example, U.S. Pat. No. 3,245,547 discloses a display means for supporting and displaying merchandise on a hole-punched display board or the like, comprising a hanger-means and a merchandise container adapted to be pendently supported thereon. The hanger means comprises a bracket adapted to hook into the hole-punched display board and a generally horizontally extending arm adapted to support a container. The horizontally extending arm comprises a pair of generally parallel, spaced wire components joined at their forward ends by means of a loop which is integral therewith, at least one of said parallel wire components being bent upwardly at its back end to form a vertical bar, and then bent forwardly in generally parallel relation to said horizontally extending arm to form a horizontal bar. The vertical bar is secured to a bracket to support both the horizontally extending arm and the horizontal bar thereon. The device also comprises a price tag bracket being mounted on the forward end of the horizontal bar.

U.S. Pat. No. D555,462 discloses a design for a dual arm pegboard hook. This design has horizontally parallel arms terminating on one end with a mounting bracket and on the other end connecting to each other via an upturned lip.

U.S. Pat. No. 4,351,440 discloses a merchandise hook for the display of carded and/or bagged merchandise having safety features. The merchandise hook is formed of a single, continuous wire-like element and includes upper and lower outwardly extending arms. The upper arm is a safety arm and has, at its outer extremity, a downwardly extending guard means, which may in part comprise an integral, downwardly extending portion of the wire. The lower portion of the display hook comprises a merchandise supporting arm, which terminates at least slightly inward of the guard means carried by the upper arm. The merchandise supporting arm can terminate in an upwardly inclined end portion, so that the end extremity of the lower wire is located behind and, in some cases, just slightly below the guard means depending from the upper arm. A removable attachment is carried by the safety arm at its forward extremity, and forms a plate-like label holder that serves in part to guard and protect the forward extremity of the merchandise hook. The label holder also serves the purpose of providing for the display, at the forward-most extremity of the unit, easy scanning by computer input equipment of a Universal Product Code label specific to the merchandise on display at the hanger.

U.S. Pat. No. 6,003,685 discloses a peg board hook and security lock assembly for displaying merchandise. This device includes a vertical mounting plate having on its upper edge a first hook portion for suspending the device from a first opening in a peg board, and a backer plate having a second hook portion, the backer plate being fastened to the vertical mounting plate for securing the lower portion of the mounting plate to a second opening in the peg board. A cantilevered post extending outwardly from the mounting plate and including on its distal end a notched surface and a locking mechanism selectively engagable with the notched surface, provides a point-of-purchase device for displaying merchandise in a reasonably secure manner so as to prevent shoplifting of the merchandise on display.

Accordingly, there is always a need for an improved peg or display hook. Additionally, there is always a need for an improved peg or display hook that has anti-sweep and/or anti-theft features. Further, there is always a need for an improved peg or display hook that allows prospective purchasers to easily view the displayed items, allows actual purchasers to easily remove one or a limited number of the displayed items from the device for purchase, and prevents potential and actual shoplifters from removing more than one or a limited number of the displayed items from the device in a certain predetermined period of time. It is to these needs, among others, that this invention is directed.

BRIEF SUMMARY OF THE INVENTION

Briefly, the present invention is a locking mechanism activated at a point of product selection comprising a movable locking protrusion which is movable from a first pivot position for releasing a predetermined quantity of the merchandise from the display bar and for preventing any remainder of the merchandise from being removed to a second pivot position for locking the merchandise on a display bar. This configuration allows a customer to remove a predetermined number of display items from a first pivot position of the locking protrusion, which causes the locking protrusion to move to a second pivot position which locks the remaining items for a predetermined period of time to prevent the taking of any additional items. After the expiration of the predetermined period of time, the mechanism moves back to a first pivot position, allowing an additional predetermined number of items to be removed while the remaining items are secured. On a common display or peg hook known in the art, a customer simply slides one or more items off of the end of the hook and then proceeds to pay for the item. In contrast, in one embodiment of the present invention, the device is an apparatus that is affixed to (or part of) a display or peg hook. In this exemplary embodiment, the display or peg hook is secured to a peg board (or other wall structure), and one or more items are supported or suspended on the display or peg hook. The device comprises a mechanism that can interfere with the sliding of the item off of the hook. As the customer is taking the first item, this item is moved across and contacts a generally L-shaped protrusion on a pivot in a first pivot position, thus causing the protrusion to pivot to a second pivot position. As the item pushes down the first leg of the protrusion, the pivoting of the protrusion causes the second leg of the protrusion to pivot upward behind the item, thus preventing a second item from being removed from the hook in the second pivot position.

The pivot also acts as a trigger which signals electronic circuitry, which programmatically determines whether to activate a solenoid. The electronic circuitry can be wired, battery powered, solar powered, USB powered, or any other suitable power source for operating electronic circuitry. If the solenoid is activated in the second pivot position, a locking mechanism is actuated to prevent the protrusion from pivoting backward. While in the second pivot position, the second leg of the protrusion forms a barrier to prevent any additional items from being removed from the hook. The circuitry then counts down a predetermined time period before reversing the direction of the solenoid, sending the mechanism back to a first pivot position. A weight in the second leg of the protrusion, optionally combined with a spring beneath the first leg of the protrusion, then causes the pivot to fall back into the first pivot position to ready the next item for removal by another customer. A key or other device carried by an employee can be used to deactivate the pivoting mechanism or allow removal of the pivot for restocking or removal of a locked item at a customer's request.

These and other uses, features, and advantages of the present invention will become more apparent to those of ordinary skill in the relevant art when the following detailed description of the preferred embodiments is read in conjunction with the appended figures.

BRIEF DESCRIPTION OF THE FIGURES

All of the figures are partial sections so as to better show the various components of the invention.

FIG. 1 comprises three views of a first embodiment of the invention.

FIG. 2 comprises three views of the first embodiment of the invention.

FIG. 3 comprises six views of the first embodiment of the invention in operation. FIGS. 3B-3C illustrate the action of the movable locking protrusion moving from a first pivot position to a second pivot position.

FIG. 4 comprises two views illustrating greater detail of a first embodiment of the locking mechanism.

FIG. 5 comprises two views illustrating greater detail of an alternative embodiment of the locking mechanism.

DETAILED DESCRIPTION OF THE PREFERRED EMBODIMENTS

Figure 1A:
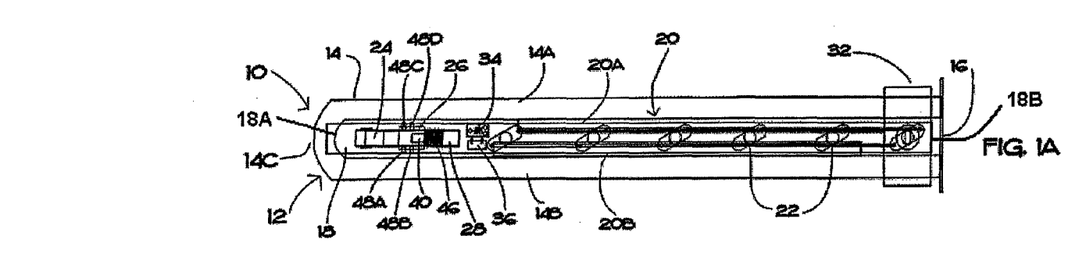
FIG. 1A is a top view of an embodiment of the device being attached to a hook.
Figure 1B:
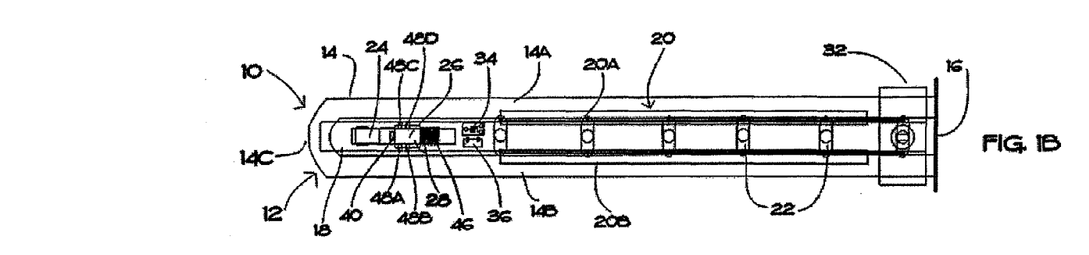
FIG. 1B is a top view of the embodiment of FIG. 1A attached to a hook.
Figure 1C:
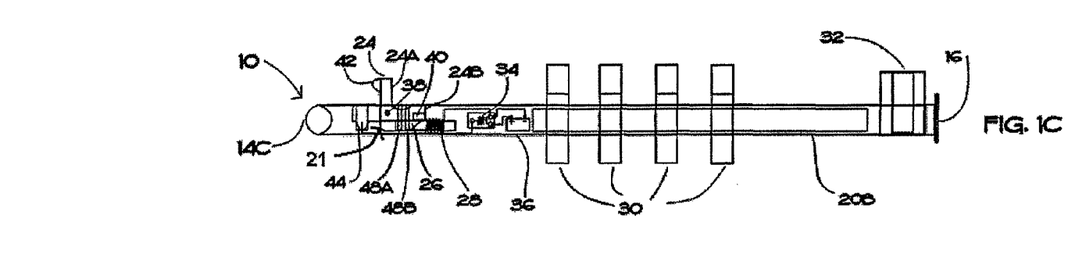
FIG. 1C is a side view of the embodiment of FIG. 1 showing the movable locking protrusion in a first pivot position and four items hanging on the hook.
Figure 2A:
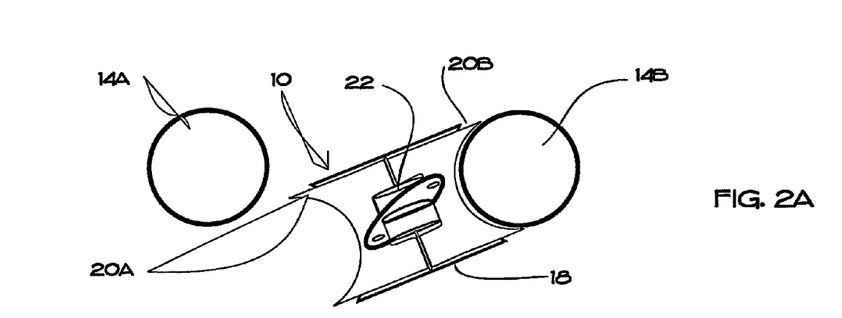
FIG. 2A is an end sectional view of the device in the process of being placed within parallel bars of the hook for attachment thereto.
Figure 2B:
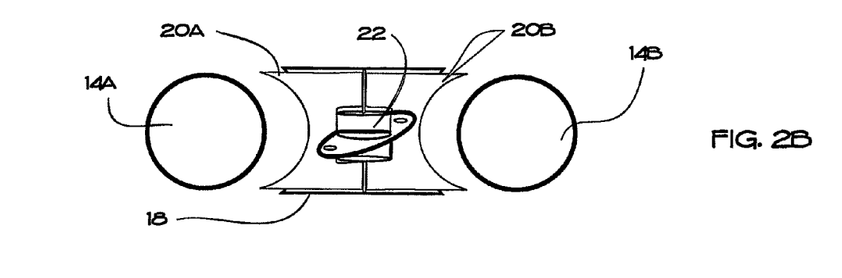
FIG. 2B is an end sectional view corresponding to FIG. 1A of the device being attached to the hook.
Figure 2C:
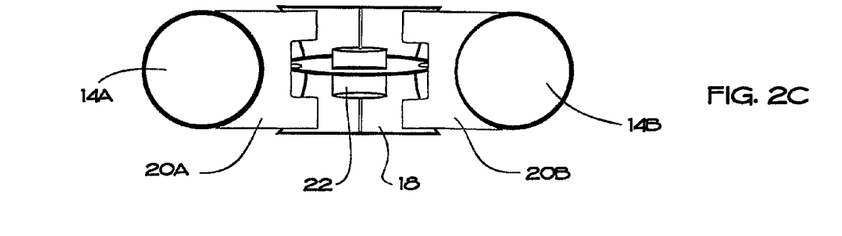
FIG. 2C is an end sectional view corresponding to FIG. 1B of the device attached to the hook.

FIG. 1A is a top view of an embodiment of the device being attached to a display hook having horizontally parallel arms joined together at one end and secured to the peg board at the other. FIG. 1B is a top view of the embodiment of FIG. 1A now attached to the hook. FIG. 1C is a side view of the embodiment of FIG. 1 attached to the hook and in the initial operating position showing the movable locking protrusion in a first pivot position and four items hanging on the hook. FIG. 2A is an end sectional view of the device in the process of being placed within the parallel arms of the hook for attachment thereto. FIG. 2B is an end sectional view corresponding to FIG. 1A of the device in the proper position for being attached to the hook. FIG. 2C is an end sectional view corresponding to FIG. 1B of the device attached to the hook.

Figure 3A:
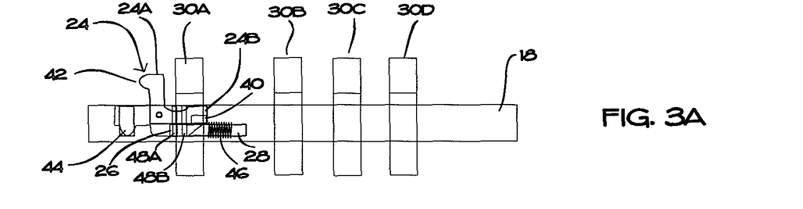
FIG. 3A shows a first item being removed from the hook and contacting the first leg of the protrusion, where the movable locking protrusion is in a first pivot position.
Figure 3B:
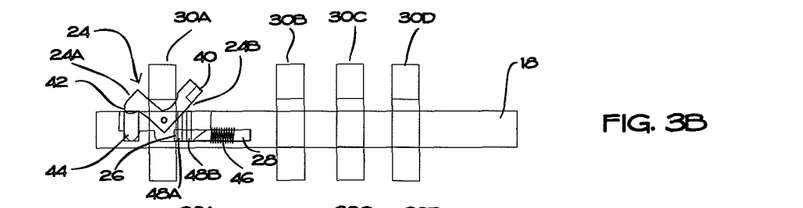
FIG. 3B shows the protrusion being pivoted by the action of the movement of the first item with the first leg moving downward in front of the path of the first item and the second leg moving upward behind the first item and in front of the second item.
Figure 3C:
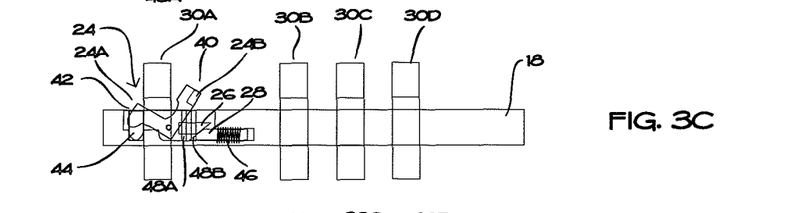
FIG. 3C shows the first leg moving further downward and entering a slot in the device triggering the circuitry and locking mechanism, the second leg moving further upward, and the locking bar being lifted to the second locked position. In combination.
Figure 3D:
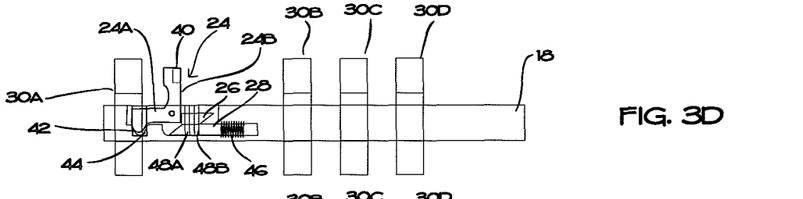
FIG. 3D shows the movable locking protrusion in a second pivot position with the first leg of the movable locking protrusion pivoted downward to a horizontal stopping point within the slot and the second leg pivoted upward to a vertical stopping point behind the first item and in front of the second item, assisted into place by the locking mechanism, and the locking bar in the second locked position.
Figure 3E:
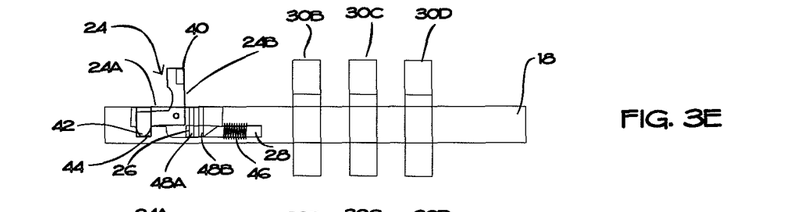
FIG. 3E shows the first item removed and the solenoid piston and locking bar returned to the first unlocked position.
Figure 3F:
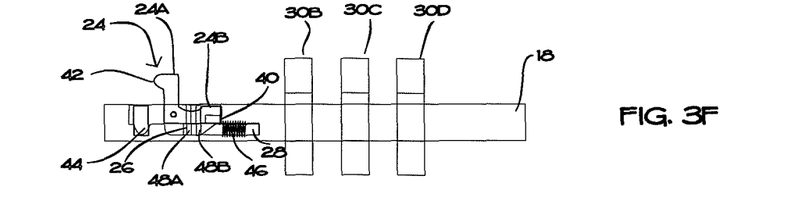
FIG. 3F shows the protrusion having pivoted back to the first pivot position.

FIGS. 3A-3F show the operation of the embodiment of the invention as shown in FIGS. 1 and 2. FIGS. 3A-3D show an item being removed from the hook and the pivoting of the movable locking protrusion from a first pivot position in FIG. 3A, allowing removal of an item from the hook, to a second pivot position in FIG. 3D, preventing removal of any additional items from the hook. Specifically, FIG. 1A shows a first item being removed from the hook and contacting the first leg of the protrusion. FIG. 3B shows the protrusion being pivoted to a second pivot position by the action of the movement of the first item with the first leg moving downward in front of the path of the first item and the second leg moving upward behind the first item and in front of the second item. FIG. 3C shows the first leg moving further downward toward a second pivot position and entering a slot in the device, triggering the circuitry and locking mechanism, and the second leg moving further upward. The locking bar can be seen being lifted to the locking position. FIG. 3D shows the first leg pivoted downward to a horizontal stopping point within the slot at the second pivot position and the second leg pivoted upward to a vertical stopping point behind the first item and in front of the second item, assisted into place by the locking mechanism. The locking bar can be seen in the second locked position, thus preventing the removal of the second and any further items from the hook. FIG. 3E shows the first item removed and the locking mechanism being reset to the first unlocked position. FIG. 3F shows the protrusion having pivoted back to the first pivot position.

Figure 4A:
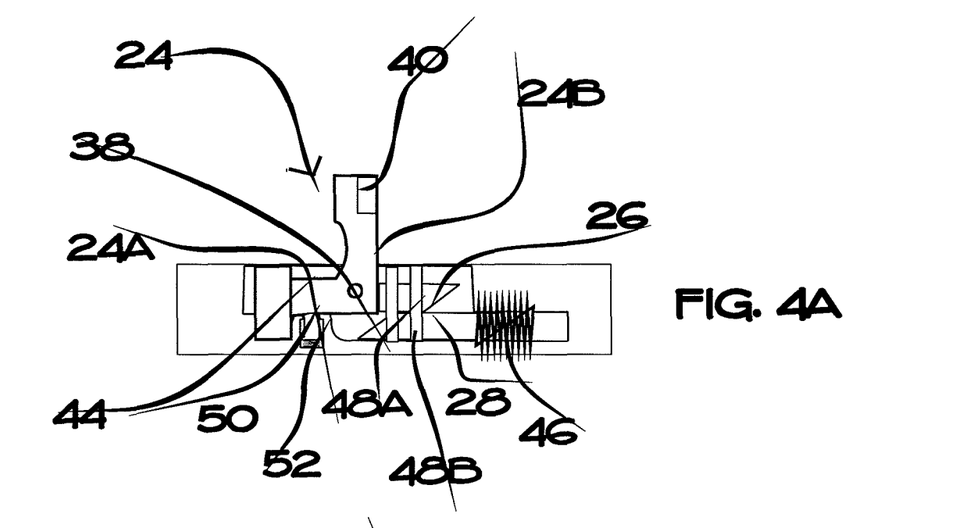
FIG. 4A illustrates the locking mechanism in the second locked position and the movable locking protrusion in a second pivot position.
Figure 4B:
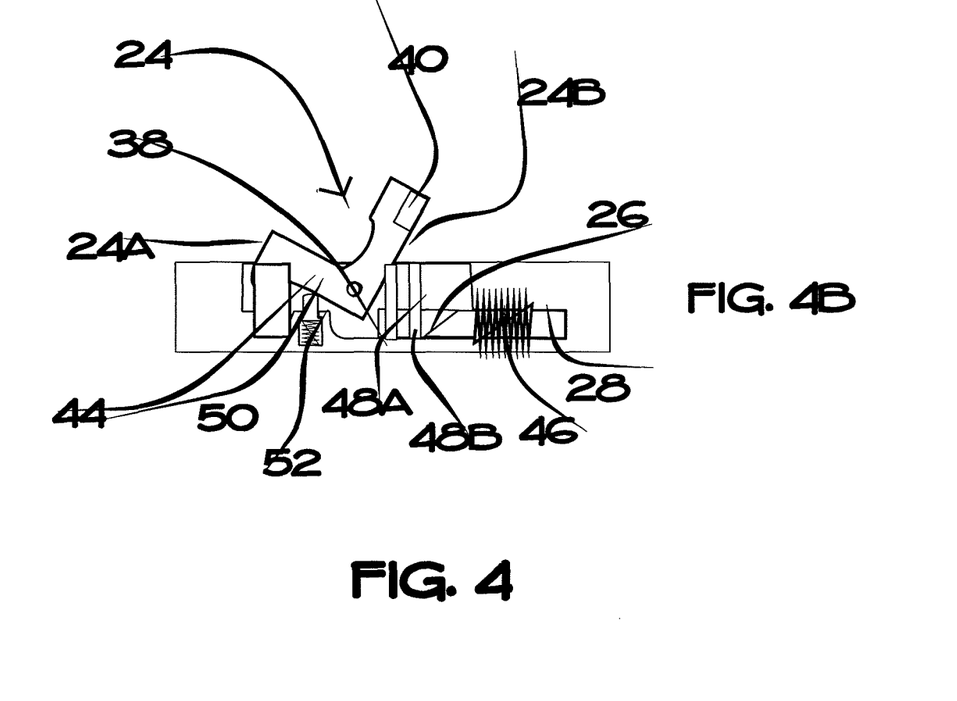
FIG. 4B illustrates the locking mechanism in the first unlocked position.
Figure 5A:
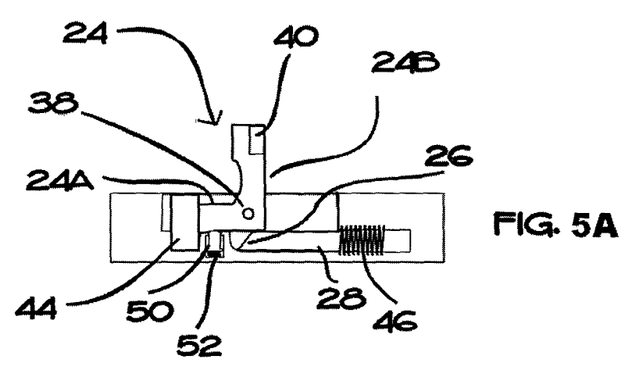
FIG. 5A illustrates the locking mechanism in the second locked position and the movable locking protrusion in a second pivot position.
Figure 5B:
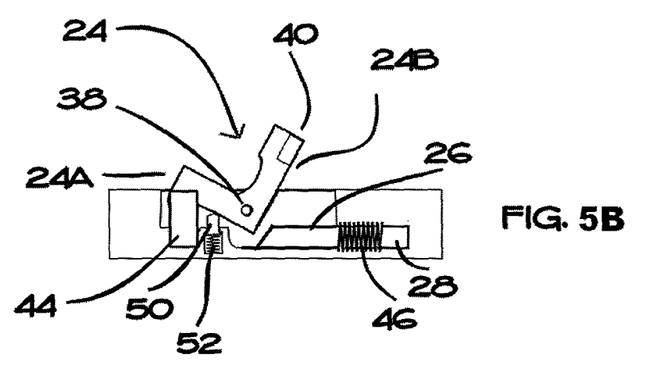
FIG. 5B illustrates the locking mechanism in the first unlocked position.

FIGS. 4A-4B illustrate a first embodiment of the locking mechanism in a second locked position and the locking mechanism returning to a first unlocked position, respectively, and showing in more detail the cooperation between the solenoid piston and the locking bar. FIGS. 5A-B illustrate an alternative embodiment of the locking mechanism in a second locked position and in a first locked position, respectively, and showing in more detail the unitary solenoid piston/locking bar structure.

The present invention is a mechanism that allows a customer to take an item from a peg or display hook, after which the hook is locked for a pre-determined period of time before allowing another item or number of items to be taken. In one embodiment, a locking apparatus or mechanism is affixed to (or part of) a hook. As the customer (or thief) is taking the first item, the item is moved across a pivoting, locking protrusion. The protrusion also acts as a trigger which signals electronic circuitry to activate a solenoid, which in turn actuates a locking mechanism to prevent the protrusion from pivoting backward. While locked in the second pivot position, the protrusion keeps additional items from being taken off of the hook. The circuitry then counts down a predetermined time period before reversing the direction of the solenoid, which unlocks the mechanism and returns it to the first pivot position. A weight in the protrusion then causes the protrusion to pivot and fall back into the first pivot position to await removal of the next predetermined number of pieces of merchandise. A key carried by an employee can be used to deactivate the locking mechanism or allow removal of the protrusion for restocking or to accommodate customer requests for the removal of additional items.

FIG. 1 comprises three views of a first embodiment of the invention. The device 10 is shown in connection with a typical display peg hook 12 having a U-shaped support bar 14 attached to a mounting bracket 16. The U-shaped support bar comprises two parallel bars 14A, 14B and a connecting end bar 14C. The device 10 comprises a central body 18, mounting mechanism 20 having attachment means 20A, 20B for cooperating with parallel bars 14A, 14B, respectively, pivoting bridge means 22 for attaching attachment means 20A, 20B to central body 18, and merchandise locking mechanism 21 (FIG. 1C). Merchandise locking mechanism 21 comprises movable locking protrusion 24, locking bar 26, solenoid piston 28, solenoid coil 46, riser bars 48A-D, pivot return bar 50, and pivot return spring 52. Merchandise 30 hangs on display peg hook 12.

FIG. 1A is a top view of an embodiment of the device 10 being attached to display peg hook 12. In this view, mounting mechanism 20 is shown in the unmounted position. The device 10 is mounted on the display peg hook 12 by setting the device 10 in the unmounted position with attachment means 20A, 20B in an offset position in which attachment means 20A, 20B are located in close proximity to the central body 18 such that the device 10 can be placed between parallel bars 14A, 14B. A first end 18A of central body 18 comprises a structure that cooperates with connecting end bar 14C so as to assist in securely holding device 10 onto display peg hook 12. A second end 18B of central body 18 comprises a lever mechanism 32 for activating mounting mechanism 20.

FIG. 1B is a top view of the embodiment of FIG. 1A attached to display peg hook 12. In this view, mounting mechanism 20 is shown in the mounted position. Using a screw driver or the like, lever mechanism 32 is rotated so as to rotate pivoting bridge means 22, which in turn moves attachment means 20A, 20B outward so as to cooperate with parallel bars 14A, 14B, which assist in securely holding device 10 onto display peg hook 12. Edges of attachment means 20A, 20B are structured to cooperate with parallel bars 14A, 14B. In this position, first end 18A and attachment means 20A, 20B provide for a secure mounting of device 10 onto display peg hook 12.

FIG. 1C is a side view of the embodiment of FIG. 1 showing the movable locking protrusion 24 in a first pivot position and four items of merchandise 30 hanging on display peg hook 12. As will be discussed in connection with FIG. 3, merchandise 30 can be removed from display peg hook 12 by sliding the merchandise toward and past merchandise locking mechanism 21 and off of first end 18A of display peg hook 12.

FIGS. 1A-1C also illustrate one configuration for merchandise locking mechanism 21. Locking protrusion 24 is an L-shaped component that is pivotally mounted in a cavity of central body 18. Locking protrusion 24 can pivot approximately 90° from the first pivot position shown in FIG. 1C to the second pivot position shown in FIG. 3D. Pivot bar 38 is located approximately at the vertex between the two legs 24A, 24B of locking protrusion 24. First leg 24A comprises trigger 42 for activating circuitry activation switch 44. Second leg 24B comprises weight 40 for returning locking protrusion 24 to the first pivot position from the second pivot position. Solenoid coil 46 activates solenoid piston 28, which acts upon locking bar 26 at approximately the vertex or the second leg 24B and is operated by timer circuitry 34. Both solenoid coil 46 and timer circuitry 34 are powered by power source 36.

In operation, solenoid coil 46 acts on solenoid piston 28 so as to slide solenoid piston 28 back and forth (horizontally as shown in the illustrative figures). Solenoid piston 28 comprises an inclined plane, and locking bar 26 comprises an inverted inclined plane. The inclined plane of the solenoid piston 28 cooperates with the inverted inclined plane of the locking bar 26 so as to lift locking bar 26 upward between riser bars 48A-48D into the second locked position. More specifically, solenoid piston 28 slides locking bar 26 up and down between the first unlocked position shown in FIG. 1C and the second locked position shown in FIG. 3D. In operation, in the first unlocked position, locking bar 26 does not interfere with the movement of locking protrusion 24, which can pivot freely between the first pivot position and the second pivot position. However, weight 40 keeps locking protrusion 24 in the first pivot position unless and until something acts upon locking protrusion 24. When a customer slides an item of merchandise 30 along display peg hook 12, merchandise 30 contacts first leg 24A, thus pivoting locking protrusion 24 from the first pivot position to the second pivot position as the customer continues to remove merchandise 30 from display peg hook 12. Weight 40 is not so heavy so as to prevent this pivoting. As locking protrusion 24 pivots to the second pivot position, trigger 42 contacts circuitry activation switch 44 causing solenoid coil 46 to activate, sliding solenoid piston 28 to move locking bar 26 to the second locked position and to initiate the timer circuitry 34.

In the second locked position, locking bar 26 has been forced upward by the action of the inclined plane of solenoid piston 28 on the inverted inclined plane of locking bar 26 such that locking bar 26 contacts second leg 24B proximal to the vertex of locking protrusion 24, thus holding locking protrusion 24 in the second pivot position, that is with second leg 24B extending upward. This locking operation is disclosed in more detail in conjunction with FIGS. 4a and 4B herein.

In an alternative configuration, solenoid piston 28 and locking bar 26 are combined into a single structure. In this alternative embodiment, in the second locked position, solenoid piston 28/locking bar 26 slides under and contacts the vertex of locking protrusion 24, thus holding locking protrusion 24 in the second pivot position, that is with second leg 24B extending upward.

In the second pivot position, no more merchandise 30 can be removed from display peg hook 12 without potentially damaging the device 10, the merchandise 30, or packaging for the merchandise 30. More specifically, with locking protrusion 24 in the second pivot position, the act of removing merchandise 30 from display peg hook 12 will cause merchandise 30 to contact second leg 24B and be held on display peg hook 12.

After a certain period of time, timer circuitry 34 causes solenoid coil 46 to move solenoid piston 28 to the first unlocked position. In the first embodiment disclosed above, this allows locking bar 26 to fall back down into the first unlocked position. In the alternative embodiment disclosed above, solenoid piston 28/locking bar 26 slides out from underneath locking protrusion 24. In both embodiments, this allows weight 40 to cause locking protrusion 24 to pivot back to the first pivot position, which will allow the removal of another item of merchandise 30.

FIG. 2 comprises three views of the first embodiment of the invention illustrating from an end view the operation of the embodiment of the mounting mechanism 20 shown in FIG. 1. These views are end views showing how the embodiment of FIG. 1 can be mounted on a display peg hook 12.

FIG. 2A is an end sectional view of device 10 in the process of being placed within parallel bars 14A, 14B of display peg hook 12 for attachment thereto. Attachment means 20A, 20B are shown in the retracted position such that they are relatively close to central body 18, and device 10 is thin enough to fit between parallel bars 14A, 14B. Device 10 is rotated so that it is located between parallel bars 14A, 14B.

FIG. 2B is an end sectional view corresponding to FIG. 1A of device 10 being attached to display peg hook 12. In this view, attachment means 20A, 20B are ready to be moved outward via the action of pivoting bridge means 22 so as to contact and cooperate with parallel bars 14A, 14B.

FIG. 2C is an end sectional view corresponding to FIG. 1B of device 10 attached to display peg hook 12. In this view, mounting mechanism 20 is shown in the mounted position. Using a screw driver or the like, lever mechanism 32 (FIG. 1) has been rotated so as to rotate pivoting bridge means 22, which in turn moved attachment means 20A, 20B outward to cooperate with parallel bars 14A, 14B so as to assist in securely holding device 10 onto display peg hook 12. As can be seen in this view in more detail, edges of attachment means 20A, 20B are structured to cooperate with parallel bars 14A, 14B.

FIG. 3 comprises six views of the embodiment of the device 10 shown in FIG. 1 in operation. More specifically, these views show an item of merchandise 30 being removed from a display peg hook 12 having the device 10 according to the present invention.

FIG. 3A shows a first of four items of merchandise 30A-30D being removed from display peg hook 12. In this view, first item of merchandise 30A has been moved (or is originally located) over movable locking protrusion 24, specifically just proximal to first leg 24A and just above second leg 24B. Locking protrusion 24, locking bar 26, and solenoid piston 28 are shown in the first pivot position and first unlocked position, respectively.

FIG. 3B shows locking protrusion 24 being pivoted to the second pivot position by the action of the movement of first item of merchandise 30A across locking protrusion 24. More specifically, as first item of merchandise 30A is moved across locking protrusion 24, it causes first leg 24A to move downward in front of the path of first item of merchandise 30A and second leg 24B to move upward behind first item of merchandise 30A and in front of second item of merchandise 30B. Locking protrusion 24, locking bar 26, and solenoid piston 28 continue to be in the first pivot position and first unlocked position, respectively.

FIG. 3C shows first leg 24A moving further downward toward the second pivot position and entering a slot in device 10 and second leg 24B moving further upward. Locking protrusion 24, locking bar 26, and solenoid piston 28 are shown moving into the second pivot position and second locked position, respectively. More specifically, first leg 24A has been pivoted to a sufficient degree such that trigger 42 contacts circuitry activation switch 44, activating solenoid coil 46, which moves solenoid piston 28 to the left. Solenoid piston 28 is shown moving to the left such that the inclined slope on solenoid piston 28 acts upon the inverted inclined slope of locking bar 26, thus beginning to force locking bar 26 upward between riser bars 48A-D.

FIG. 3D shows first leg 24A pivoted downward to a horizontal stopping point within the slot and second leg 24B pivoted upward to a vertical stopping point behind first item of merchandise 30A and in front of second item of merchandise 30B. In this view, solenoid piston 28 has been moved sufficiently to the left to move locking bar 26 upward and into a position against second leg 24B proximal to the vertex of locking protrusion 24 so as to lock locking protrusion 24 with second leg 24B upright into the second pivot position. With locking protrusion 24 being locked in the second pivot position, display peg hook 12 is locked closed so as to prevent or make more difficult the removal of second item of merchandise 30B (and other items of merchandise 30C, 30D, etc.) from display peg hook 12. Timer circuitry 34 also has been activated.

FIG. 3E shows first item of merchandise 30A removed and locking protrusion 24 locked in the second pivot position. However, in this view, timer circuitry 34 has counted down and solenoid coil 46 has been instructed by timer circuitry 34 to move solenoid piston 28 to the first unlocked position (to the right in this figure), thus allowing locking bar 26 to return to the first unlocked position.

FIG. 3F shows locking protrusion 24 having pivoted back to the first pivot position. Weight 40 has caused now freely pivotable locking protrusion 24 to pivot back to the first pivot position, ready for the removal of second item of merchandise 30B. At this juncture, the cycle of pivoting, locking, and unlocking upon the removal of merchandise starts again, as shown in FIG. 3A, and so forth.

FIGS. 4A and 4B illustrate the locking action of the embodiment shown in FIG. 1 in more detail. FIG. 4A shows the device locked in the second pivot position with solenoid piston 28 having lifted locking bar 26 upward into position against second leg 24B proximal to the vertex of locking protrusion 24. FIG. 4B shows the device in the first unlocked position, with locking protrusion 24 being returned to the first pivot position by the force of weight 40. FIGS. 4A and 4B also illustrate another embodiment of the present invention, having an additional mechanism for assisting in the return of locking protrusion 24 to the first pivot position, namely pivot return bar 50 and pivot return spring 52.

FIG. 4A shows solenoid piston 28 located underneath locking bar 26 and holding locking bar 26 in the second locked position. Riser bars 48A-48D maintain locking bar 26 in a suitable position for securing locking protrusion 24. In this position, locking protrusion 24 has forced pivot return bar 50 downward within a niche thus compressing pivot return spring 52. FIG. 4B shows solenoid piston 28 having moved out from underneath locking bar 26, thus allowing locking bar 26 to return to its original, first unlocked position. In this position, pivot return spring 52 forces pivot return bar 50 upward, thus pivoting locking protrusion 24 and assisting weight 40 in returning locking protrusion 24 to its original, first pivot position.

The separate solenoid piston 28 and locking bar 26 embodiment allows trigger 42 to initiate the locking mechanism 21 while locking protrusion 24 is still only halfway actuated (pivoted), creating a point of no return that activates locking mechanism 21 before allowing the removal of merchandise 30. Due to variations in product packaging, this flexibility in the trigger 42 initiation point allows for constituent actuation of the locking mechanism 21 as different types of merchandise packaging pass over display peg hook 12 at different angles of actuation. Further, with this configuration, the convex leading edge of locking protrusion 24 is designed to be flush to the device 10 at the time of actuation, meaning no force can be applied by solenoid coil 46 if there is an obstruction.

FIGS. 5A and 5B illustrate the locking action of an alternative embodiment of the locking mechanism 21 in more detail. In this alternative embodiment, the solenoid piston 28 and the locking bar 26 are a single or unitary structure that slides back and forth (left and right as shown in the figures). FIG. 5A shows the device locked in a second pivot position with solenoid piston 28/locking bar 26 having been shifted into position underneath and against first leg 24A proximal to the vertex of locking protrusion 24. FIG. 5B shows the device in the first unlocked position, with locking protrusion 24 being returned to the first pivot position.

The device can be a retrofit for mounting on a separate display rod or can be manufactured in conjunction with display rods.

The timer circuitry 34 can be preprogrammed to lock the device 10 for a predetermined period of time, can include an adjustment means for programming the period of time in situ, or can include a transceiver means for remotely programming the period of time. The locking protrusion 24 can be structured to allow a single item of merchandise 30, two items of merchandise 30, or more items of merchandise 30 to be removed from the display peg hook 12 during one period of time. The power source 36 can be any suitable power source, including a permanent battery, a removable battery, a rechargeable battery, or a wired power source.

Other features can include an auger, a turnstile, or a sliding curved bar in place of locking protrusion 24. The merchandise locking mechanism 21 can be attached to and cooperate with a drawer or shelf-top lock. A display and/or indicator can be added to inform the customer of the countdown timer and/or lock status (attached or remote) so that the customer will know when the device 10 will return to a first pivot position and another item of merchandise 30 can be removed from the display peg hook 12. The timer circuitry 34 can be programmed to count merchandise 30 removal and the frequency of merchandise 30 removal so as to automatically change the locking interval if pre-defined thresholds are met. A transmitter, receiver, or transceiver can be included to communicate with an external system for the purposes of generating alerts when pre-defined thresholds are met for security reasons and/or for tracking inventory. The present invention can be configured to be locked in a second pivot position by default, with unlocking and returning to a first pivot position to occur only upon receiving a signal from an outside system such as the signal from a credit card reader, an outside computer, or a device equipped to transmit a signal upon the receipt of a certain amount of money. Such a configuration is ideal for use in a vending machine either in an opened or enclosed state.

The present invention takes advantage of the fact that customer demand is usually spread out over time. It is a relatively rare occurrence that multiple customers want the same product at the same time from the same store, or that a customer wants more than one of the same product; especially for high priced specialty items that would be likely to be protected. Even when these instances occur, a customer seeking the second product has the option of waiting for the time lock to open or finding an employee to unlock the mechanism. Unlike the obstructive systems currently in use, the device of the present invention is nearly as easy to remove the product from as if there were no security measures at all. Also unlike prior art systems, the present invention does not just slow someone from removing merchandise, it can stop a person (assuming maintained integrity of the system and product package) for a definite time period. The present invention also has the ability to be programmed with a predetermined time optimized for the product it will be protecting. For example, it may be more desirable to incorporate a longer delay time for a locking device protecting a product that costs $200 and sells three units per week compared with a lesser time for a product that costs $50 and sells ten units a day. Also, in one embodiment, enough space is left in front of the device to allow the customer to place one item back on the rack after removing it to inspect it.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. An anti-sweep device for locking merchandise at a point of product selection, the device comprising:
   a) a mounting mechanism for attaching the device to a display bar;
   b) a central body attached to said mounting mechanism;
   c) a movable locking protrusion, said locking protrusion further comprising an L-shaped component that is pivotally mounted within said central body, said locking protrusion being movable from a first pivot position for releasing a predetermined quantity of the merchandise from the display bar and for preventing any remainder of the merchandise from being removed from the display bar to a second pivot position for locking the merchandise on the display bar; and
   d) a locking bar, wherein a solenoid coil moves said locking bar from an unlocked position while the locking protrusion in the first pivot position to a locked position for locking the locking protrusion in the second pivot position and blocking the locking protrusion from returning to the first pivot position until said solenoid coil is deactivated,
   wherein the display bar comprises parallel bars and said mounting mechanism further comprises edge attachment means adapted to cooperate with the parallel bars whereby the device is located between and supported by the parallel bars, and
   wherein the edge attachment means are pivotally connected to a pivoting bridge means, wherein said edge attachment means attach said device to said parallel bars upon the pivoting of the pivoting bridge means.

2. The anti-sweep device of claim 1, wherein said locking bar further comprises:
   e) a solenoid piston in contact with the locking bar and activated by the solenoid coil, wherein said solenoid piston moves the locking bar into the locked position upon the engagement of the solenoid piston and wherein the locking bar in the locked position blocks said locking protrusion from returning to the first pivot position until said solenoid piston is disengaged.

3. The anti-sweep device of claim 1, further comprising means for transmitting data representing merchandise removal events to an external system.

4. The anti-sweep device of claim 1, wherein the device is in the second pivot position by default and only moves to the first pivot position when signaled to do so by an outside system.

5. The anti-sweep device of claim 1, wherein said mounting mechanism is attached to the display bar in response to the activation of a lever mechanism, whereby upon activation of the lever mechanism, the edge attachment means are moved outwards to cooperate with said parallel bars to attach said mounting mechanism to the display bar.

6. A device for preventing the removal of more than a pre-determined number of items of merchandise from a display, said device comprising:
   a) a central body;
   b) a locking protrusion having a vertex, said locking protrusion pivotally mounted in said central body at said vertex, and having a first leg and a second leg attached at said vertex, said first leg having a trigger;
   c) a circuitry activation switch mounted in said central body in contact with said trigger when said locking protrusion is in a second pivot position;
   d) a locking bar that is moved against the locking protrusion upon the engagement of the circuitry activation switch by the trigger, wherein said locking bar blocks the vertex or the second leg of the locking protrusion, preventing the locking protrusion from pivoting, such that the locking protrusion remains in the second pivot position and cannot return to a first pivot position for a predetermined amount of time.

7. The device of claim 6, further comprising a solenoid piston capable of moving in response to engagement of the circuitry activation switch, and capable of moving the locking bar into a locked position in order to lock the locking protrusion in the first pivot position.

8. The device of claim 6, wherein the locking bar acts upon the vertex.

9. The device of claim 6, wherein the locking bar acts upon the second leg.

10. The device of claim 7, wherein said second leg further comprises a weight, and wherein said weight pivots and returns said locking protrusion to the first pivot position after said locking bar is lowered.

11. The device of claim 10, further comprising a return bar and a pivot return spring, wherein said return bar and pivot return spring assist the weight in returning said locking protrusion to the first pivot position upon the lowering of the locking bar.

12. The device of claim 6, further comprising a mounting mechanism comprising edge attachment means adapted to cooperate with parallel bars of a display bar and pivotally connected to a pivoting bridge means, wherein said edge attachment means attach said device to said parallel bars upon the pivoting of the pivoting bridge means.

13. The device of claim 12, wherein said mounting mechanism is attached to the display bar in response to the activation of a lever mechanism, whereby upon activation of the lever mechanism, the edge attachment means are moved outwards to cooperate with said parallel bars to attach said mounting mechanism to the display bar.

14. A point of product selection merchandise display device, comprising:
   a) a display bar on which the merchandise is mounted for display and from which a customer can retrieve the merchandise;
   b) an L-shaped movable locking protrusion having a vertex, a first leg, and a second leg attached to and extending therefrom, said locking protrusion being movable from a second pivot position for locking the merchandise on the display bar to a first pivot position for releasing a predetermined quantity of the merchandise from the display bar and for preventing any remainder of the merchandise from being removed from the display bar, and from the first pivot position to the second pivot position;
   c) a locking bar, wherein a solenoid coil moves said locking bar from an unlocked position to a locked position and blocks said locking protrusion from returning to a first pivot position until said solenoid coil is deactivated, wherein the L-shaped component is pivotable, at the vertex, between the second pivot position and the first pivot position, wherein in the second pivot position, the first leg of the L-shaped component prevents the merchandise from being removed from the display bar and in the first pivot position the second leg of the L-shaped component allows the predetermined quantity of the merchandise to be removed from the display bar and prevents any remainder of the merchandise from being removed from the display bar; and d) a mounting mechanism comprising edge attachment means, wherein the display bar comprises parallel bars in between which said locking protrusion and said locking bar are located, wherein said mounting mechanism is adapted to cooperate with said parallel bars whereby the device is located between and supported by said parallel bars, and wherein said edge attachment means are pivotally connected to a pivoting bridge means, wherein said edge attachment means attach the device to said parallel bars upon the pivoting of said pivoting bridge means.

15. The device of claim 14, wherein said locking bar further comprises a solenoid piston in contact with the locking bar and activated by a solenoid coil, wherein said solenoid piston moves the locking bar into the locked position upon the engagement of the solenoid piston and wherein the locking bar in the locked position blocks said locking protrusion from disengaging from the second pivot position until said solenoid piston is disengaged.

* * * * *